United States Patent Office 2,743,196
Patented Apr. 24, 1956

2,743,196

PROCESS OF PRODUCING REDUCED GLASS RESISTANCE ELEMENTS

Preston Robinson, Williamstown, Mass., assignor to Sprague Electric Company, North Adams, Mass., a corporation of Massachusetts No Drawing. Application December 28, 1951, Serial No. 263,990

9 Claims. (Cl. 117—227)

This invention relates to the small glass particles covered with a surface film coating of a metal or metal alloy, and methods of making these particles.

The co-pending application for United States Letters Patent, Serial No. 190,109, filed October 14, 1950, by David B. Peck, and now Patent No. 2,717,946, granted September 13, 1955, discloses a number of types of resistance units formed by reducing the surface of a glass base to produce a thin conducting metal film. All of the resistance elements formed in accordance with this Peck application are extremely advantageous for a variety of reasons, as indicated in it. The elements, however, are somewhat expensive to produce. In addition, the particle units formed in accordance with the Peck application are difficult to form in such a manner that they have predictable uniform characteristics.

It is an object of this invention to produce small particle resistance units by a new process in such a manner that they have predictable electrical coefficients and characteristics. A further object of the invention is to produce resistance elements which may be conveniently used in a variety of applications. These and other objects of the invention, as well as the advantages of it, will be apparent from the study of the following specification and the appended claims.

The above objects are achieved by reducing the surfaces of glass particles having special compositions or coatings with a gas while subjecting the particles to agitation by means of the same gas so as to produce thin conductive films on the surfaces of the particles.

In accordance with one modification of the invention the agitation is carried out so that individual particles are suspended in a comparatively fixed position. In accordance with a second modification of the invention particles are moved while being held in a constant state of agitation by the gas employed during the reduction process. It is readily seen that this second modification differs from the first in that in the first particles are only agitated by the gas, while in the second they are both agitated and moved by the gas.

The term "glass" as used in this specification is to be construed broadly, and includes various types of special silica glasses, quartz, and steatites. In order to be suitable for use with this invention all of these special composition glasses must contain from about 3% to about 82% of reducible constituents, such as lead oxide, silver oxide, gold oxide, antimony oxide, and bismuth oxide. Of these various constituents, lead oxide is perhaps most desirable. Frequently mixtures of these reducible constituents may be advantageously employed in order to gain certain characteristics in the final product.

Of course the concentration of reducible metal oxides in glass used depends on the final product, and the chemical nature of the oxide. Lead oxide may be present in amounts up to 82%; with bismuth oxide best results are obtained when it is present in amounts from about 5% to about 55%; with antimony oxide present at from 5% to 25%; and with silver oxide present at from 3% to 20%.

Sodium oxide, potassium oxide, calcium oxide, lithium oxide, beryllium oxide, magnesium oxide, aliminum oxide, iron oxides, zinc oxide, and the like, may all be employed as the other constituents of the solid solutions employed with this invention. In addition, the glasses used may contain fluorides and other materials commonly present as fluxing ingredients.

The glass compositions employed in accordance with the present invention are preferably ground to such a size that they will pass a 40 mesh screen, but will not pass a 325 mesh screen. Temperatures of from about 75° C. to about 800° C. can be employed with either of the modifications in order to secure satisfactory resistance films. A preferred range within this particular range of temperatures is from about 100° C. to about 400° C. Those glasses containing a high proportion of lead are most advantageously treated at from about 275° C. to about 375° C.; those glasses with a high proportion of silver from about 100° C. to about 200° C.; and those with a high proportion of bismuth at from about 100° C. to about 250° C.

The actual treatment with both of the modifications or embodiments of the invention is carried out using any of the common reducing gases such as, for example, hydrogen, methane, ethane, and the various related illuminating hydrocarbons.

A great many factors enter into the precise operating conditions required with either of the modifications indicated. To utilize a fixed bed of particles satisfactorily the weight of the bed must be such that it can be suspended by the gas screen in such a manner that each individual particle is subjected to constant agitation. The use of either too high a gas velcoty, or too heavy a bed of particles, will result in uneven agitation and bubbling of the gas throughout the particle bed. Both of these results are to be avoided. It is preferred to use gas velocities of from about 0.175 to about 2.5 ft. per second based on the empty cross section of the vessel containing the particles in order to obtain the proper degree of agitation and suspension in a fixed bed.

The same difficulties caused by the use of too heavy a bed of particles or improper gas velocities are apparent with the second embodiment of the invention, wherein a moving bed of individual particles is employed. With this modification, velocities of from about 3.5 ft. to about 40 ft. per second based on the empty cross section of the reaction vessel, and solids movement rates of from about 2 to about 55 lbs. per square ft. cross section of the reaction container produce satisfactory results. It is to be emphasized that this second embodiment of the invention is essentially a continuous one in which particles are constantly added to one end of the reaction vessel and taken away from the other end of the vessel. The above figures in regard to velocities and solids movement ratios are given for a bed which is in constant movement upward along with stream of gas utilized. A bed under this condition is said to have a positive slip velocity because the gas velocity minus the solids velocity is positive. When this figure is negative such a moving bed is said to have a negative slip velocity. Although satisfactory results may be obtained from such beds having a negative slip velocity, they are not as conveniently controlled and as advantageous to use as those beds having positive slip velocities.

Perhaps the different embodiments of the invention will be best understood with reference to the following specific examples, which are given by way of illustration only and are not to be construed as limiting the invention in any respect.

Example 1

A ½" internal diameter tube 30" high was placed over a supporting manifold consisting of a gas inlet chamber, a packed gas distributive section and a 200 mesh supporting screen. 12 to 40 lbs. of glass particles consisting of 62% PbO, 33% $SiO_2$ and 5% $Na_2O$, having an average particle diameter of about 0.0224" were placed within the tube above the supporting screen. Hydrogen heated to approximately 285° C. was admitted to the bottom of the column so that it would pass through it at a velocity of about 0.837' per second. At this velocity the bed of particles expanded to a height of approximately 15.4", and each of the individual particles was surrounded by a thin film of gas and was subjected to a slight amount of agitation. The gas flow was increased to a velocity of about 0.869' per second at a gas pressure of about 110.1 lbs. per square ft. At this point the bed varied in length from about 15.45" to about 16.65". The same conditions of agitation persisted within the bed. The gas flow was continued for a period of 3 hours. At the end of this time the flow was stopped and the column of particles was allowed to slowly cool. The individual particles were then removed and employed as indicated in the aforesaid Peck application.

Example 2

Using the same apparatus and gas velocities as indicated in the preceding example, hydrogen at 315° C. was passed through a bed of glass particles having an average composition of about 52% $SiO_2$, 18.5% $Na_2O$, and 29.5% $Bi_2O_3$, and having average particle diameters of about 0.0224" for a period of 4 hours. At the end of this time the individual particles were cooled and employed as indicated above.

Example 3

Using the same apparatus and gas velocities given in Example 1 above, glass particles having average diameters of about 0.0224" and average compositions of about 54% $SiO_2$, 24% PbO, 3% $Na_2O$, and 29% $Bi_2O_3$, were reduced for a period of 10 hours with illuminating gas (natural gas) heated to a temperature of 350° C. At the end of this time the individual particles were cooled and employed in resistance elements.

Example 4

Glass particles composed of 75% PbO and 25% $SiO_2$ were treated for 4 hours by ethane heated to 325° C. in the apparatus indicated in Example 1. The same gas velocities employed in the first example were also employed here. At the end of the indicated period the glass coated particles were cooled and employed as indicated above.

Example 5

A 10' high 1¼" internal diameter tube was set in a perpendicular position so as to have both an air and a solids inlet positioned immediately below its bottom and a cyclone separator connected to its top. An appropriate feed type arrangement was provided to connect the solids exit of the separator to the solids inlet at the bottom of the tube, together with means for introducing new particles into this closed system, as well as removing old particles from it. 0.0016" diameter glass particles having an approximate composition of 68% PbO and 32% $SiO_2$ were introduced into the bottom of the reaction tube at the rate of 1.98 lbs. per square ft. of the reaction tube diameter per second along with a stream of methane heated to 310° C. until a bed density within the tube of approximately 1.02 lbs. per cubic ft. was built up. The gas velocity employed was approximately 4.00' per second based on the empty cross section of the tube. The slip velocity of the particles was calculated to be approximately positive 2' per second once stable conditions within the bed, as indicated, had been achieved and were being maintained by recirculation of the particles from the top of the tube through the cyclone separator and into the bottom of the tube. This recirculation was continued for a period of 14 hours, at which time the entire mass of particles being treated was separated, cooled, and employed in resistance elements as indicated.

Example 6

Particles of the approximate size employed in the preceding example containing 61% PbO, 37.5% $SiO_2$, and 1.5% $Bi_2O_3$, were treated for a period of 1 hour using methane at 350° C. in the apparatus indicated in Example 5. The same gas velocities, bed density, etc., utilized in this example were employed. At the end of the period the individual particles were removed, cooled and utilized in electrical applications.

Obviously the electrical properties of the final products prepared in accordance with this invention vary with the length of the reducing treatment, and the temperature employed with this treatment. In many instances it is advantageous to preheat the individual glass particles to be reduced as by heating in an oven, or passing an inert gas heated to an elevated temperature through a bed of particles. If desired, auxiliary heating, as for example, jackets around the reaction vessels or induction heating equipment around the reaction vessels, may be used to either supplement the heat supplied by the reducing gas, or substantially take the place of this heat.

In many instances it is advantageous to apply a reducible covering or coating to the particles of this invention before they are subjected to the reducing treatment indicated above. This may be done in several ways. For example, a batch of particles may be dipped in a salt solution and then dried, or, a salt solution may be sprayed upon the particles as they are being handled or tumbled. With this last method of application suitable organic binders such as various cellulose derivatives, gums, and the like, can be included with the salt solutions. The reduction products of these coverings or coatings can be fused into the glass particles by the use of appropriately high temperatures in order to obtain various mixed composition films upon these particles. Alloy films obtained in this manner frequently have very desirable electrical characteristics.

While the individual particles manufactured in accordance with this invention are primarily designed as components of resistors, they may in certain circumstances be employed in other electrical applications. By appropriate choosing of the initial glass composition or of reducible surface coatings, particles having either P or N type conductance can be produced. Such particles can be used in various other electrical applications besides resistors. The metallic films produced in accordance with this invention can also be altered by the passage of a metal-containing gas upwards and through the reaction bed of the particles after the reduction of the individual particles is complete, in order to produce alloy type conductive films of either P or N conductance types.

As many apparently widely different embodiments of this invention may be made without departing from the spirit and scope hereof, it is to be understood that this invention is not limited to the specific embodiments hereof except as defined in the appended claims.

What is claimed is:

1. A process of producing electrically conductive particles, comprising suspending by a stream of reducing gas a bed of particles small enough to pass through a 40-mesh screen, and consisting essentially of prepared glass containing a reducible heavy metal oxide, said gas being heated to a temperature sufficient to reduce the surfaces of said particles to electrically conductive films.

2. A process as defined in claim 1 wherein said glass particles contain from about 3% to about 82% of reducible heavy metal oxides.

3. A process as defined in claim 1 wherein said particles have been coated with a reducible heavy metal oxide.

4. A process of producing electrical resistance particles capable of use at elevated temperatures, which comprises forming in a vessel a bed consisting essentially of glass particles that pass through a 40-mesh screen and contain from 3% to 82% reducible heavy metal oxides, and agitating said bed by a stream of a reducing gas heated to from about 75° C. to about 800° C. passing through said bed at a velocity of from about 0.175 to about 2.5 feet per second based on the empty cross section of said vessel.

5. A process as defined in claim 4 wherein said particles do not pass through a 325 mesh screen.

6. A process of producing electrical resistance particles which comprises providing a bed consisting essentially of glass particles small enough to pass through a 40-mesh screen, the particles containing a reducible heavy metal oxide, continuously moving and agitating said bed through at least a portion of a closed path by means of a reducing gas heated to from about 75° C. to about 800° C. passing through said particles at a velocity of from about 3.5 feet per second to about 40 feet per second.

7. A process as defined in claim 6 wherein said particles are moved at solids movement rates of from about 2 to about 55 lbs. per square ft. of cross section of the path.

8. A process as defined in claim 6 wherein the particles do not pass a 325 mesh screen, the reducing gas is methane, and the particles are subjected to the heated gas for a period of from about 5 minutes to about 24 hours.

9. The process which comprises preparing a fluidized mixture consisting essentially of a reducing gas mixed with glass particles small enough to pass through a 40-mesh screen and containing a reducible heavy metal oxide at least on their surfaces and heating the mixture to a temperature sufficient to reduce said oxide and provide an electrically conductive film on said surfaces.

References Cited in the file of this patent

UNITED STATES PATENTS

| | | |
|---|---|---|
| 2,339,928 | Hood | Jan. 25, 1944 |
| 2,365,720 | Nieghbors | Dec. 26, 1944 |
| 2,414,625 | Abrams et al. | Jan. 21, 1947 |
| 2,635,947 | Reed | Apr. 21, 1953 |